April 17, 1962     R. A. G. CAPE     3,029,974
VESSEL LININGS
Filed April 14, 1960
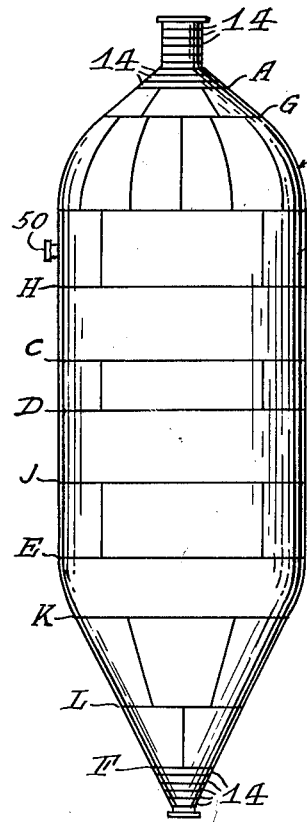
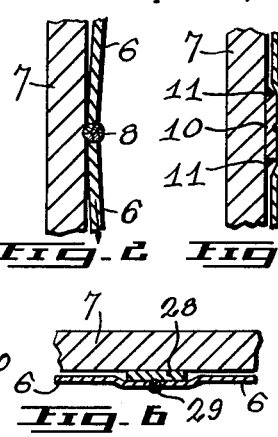
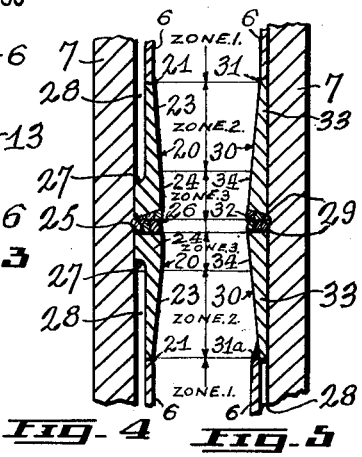
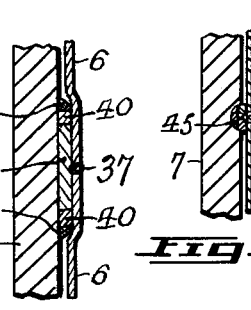
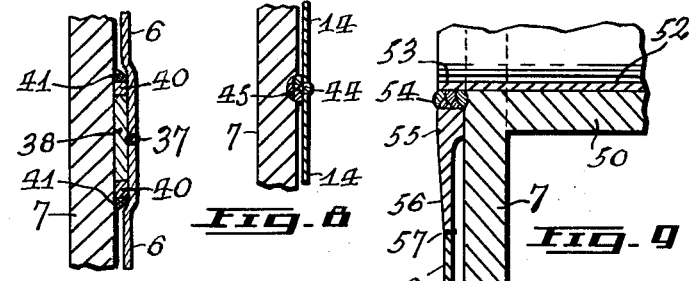
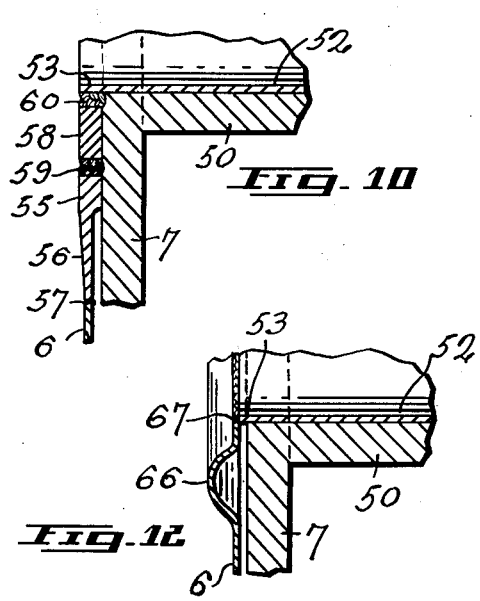
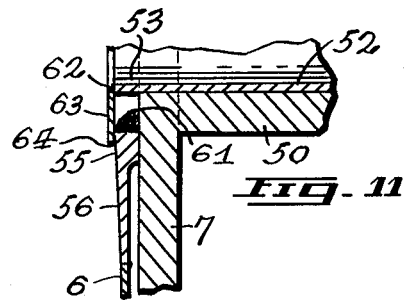
Inventor
R. A. G. CAPE
By Fetherstonhaugh &Co.
Attorneys

United States Patent Office 3,029,974
Patented Apr. 17, 1962

3,029,974
VESSEL LININGS
Richard Allan Gordon Cape, Lachine, Quebec, Canada, assignor to Dominion Bridge Company, Limited, Montreal, Quebec, Canada
Filed Apr. 14, 1960, Ser. No. 22,309
18 Claims. (Cl. 220—63)

This invention relates to improvements in liners for the protection of vessels employed in the containment of corrosive materials.

A vessel of this type is usually filled or partially filled with liquids, gases, and/or solids which are subjected to both temperature and pressure changes. In order to accommodate the same it has been found that the vessels are best fabricated from relatively inexpensive carbon or low alloy steels which will meet structural and pressure requirements. Such steels may, however, be unsuitable in contact with the vessel contents, by reason of abrasion or corrosion of the steel vessel as a result of the contents or even due to the fact that the steel of the vessel may have a tainting effect on the contents.

In instances similar to those outlined above, it is desirable in the original design of the vessel or during the repair of same, to utilize a thin lining of a special metal which is suitable for contact with the contents of the vessel and which effectively separates the contents from the body of the vessel and thus eliminates both contamination of the vessel contents and corrosion of the body of the vessel.

Thin linings are not generally considered to share in the structural or pressure strength of the vessel. Nevertheless they must be pressure tight to contain liquids or gases and may be subject to greater stress than the body of the vessel. In addition, the effect of temperature requirements in service may strain the lining to a greater extent than the vessel and in consequence produce high stress and stress concentration areas. Thus a lining may be subjected to axial, hoop and shear stresses and strains which may be of considerable magnitude. In addition, suitable lining metal may readily differ from the vessel metal in thermal coefficients of expansion and contraction and in consequence variations in temperature between lining and shell produce exaggerated stress conditions.

If the number of cyclic changes in temperature and pressure for the expected life of the vessel is large, the possibility of fatigue failure in the lining becomes critical. In consequence of these factors, it is customary to line vessels with a suitable lining metal which is welded to the vessel with welds at closely spaced intervals. This is commonly known in the trade as "strip lining." The width of these strips is often restricted by specification to 6" or less. The width of the strip is generally decreased in proportion to increasing temperature ranges. If the spacing between welds is too great constant or varying stresses may induce failure in the welds or lining metal. Large thin sheets have been used for lining purposes but attachment welds in the form of butt, fillet, plug, slot or resistance welds are usually closely spaced over the area of the sheet to avoid overstressing due to warping or bending. Such extensive welding greatly increases the cost of fabrication. In addition, each weld prevents a possibility of leakage and a focal spot for fatigue and for corrosion due to the difficulty of obtaining identical chemistry in weld metal and lining metal. It is therefore highly desirable to use the least amount of welding consistent with good design and practice.

Large thin sheets have been attached to the inside of cylindrical vessels by means of widely spaced circumferential welds when annular corrugations in the lining sheets, between the welds, was provided to compensate for expansion and contraction. The corrugations form a bellows which will absorb axial strain or movement of the liner. Axial stress in the liner is therefore reduced. However, the axial movement which is permitted by the corrugation is highly objectionable if attachments must be made between the vessel liner and liners in nozzles. The latter are rigid. Relative movement of the shell and liner is then most undesirable.

Furthermore, the liner metal between the widely spaced circumferential welds is subject to radial movement either inward or outward by reason of pressure or temperature variations. At the points of restraint, i.e., the circumferential welds, high bending stresses in the liner and welds will result from any radial liner movement. These stresses may be calculated from Schorer's analysis of restraint in large diameter pipes (see Transactions of A.S.C.E. 1933). The bending stresses so calculated will be 182% of the liner hoop stresses.

The present invention proposes to overcome the above difficulties and disadvantages inherent in the conventional types of vessel liners.

A particular object of this invention is to provide a liner for vessels of the character described in which the liner is formed substantially throughout of substantially wide circumferentially extending bands of relatively thin sheets of metal, certain of these bands being secured together along adjacent marginal edges to permit freedom of movement of the liner in the radial direction thereof and certain others being connected to the vessel at predetermined locations by connecting means having tapering flexible sections capable of restraining axial movement of the liner relative to the vessel and yet permitting radial movement of the liner without high bending stresses which would result in fatigue failure of the liner or welds.

When normal methods of attachment of a lining in a vessel are used and when the lining is then, say ⅛" and the distance between lining attachment welds is large, say 12" or more, portions of the lining are able to move radially. If backing bars are used at the weld joints, the movement of the lining may then be either inward or outward depending on temperature or pressure or both. Manufacturing variations are such that it cannot be assumed that in its original position the lining is in contact with the shell.

If the lining moves outward relative to the shell by reason of pressure, a hoop stress is induced in the unrestrained portion of the lining in accordance with conventional formula where hoop stress is equal to the pressure times the radius divided by the thickness. Bending stress at the points of restraint, in the region of the welds, is then 182% of the hoop stress according to Schorer's analysis.

If the radial movement of the liner remote from the welds occurs either inward or outward relative to the shell by reason of temperature changes, the bending stress at the welds is again 182% of the hoop stresses which would have resulted from an equivalent pressure-induced strain. If pressure alone caused liner deflection it would not be feasible to increase the liner thickness to compensate for increased bending stresses at the points of restraint since stresses would then increase. When deflection of the liner is caused by temperature, the bending stresses will always be of the same magnitude regardless of the thickness of the liner.

The point of attachment of the liner to the vessel produces a notch such that bending stresses at the root of the weld are magnified by a factor of several hundred percent. This greatly increases localized bending stresses.

In addition, direct axial stresses imposed by either pressure or temperature or both must be absorbed at the attachment welds. In previous designs, these welds were sometimes fillet welds having a nominal throat of .707 times the fillet size. The weld stress due to axial load alone is then one divided by .707 or 142% of the axial stress.

A brief summary then indicates that liner attachment welds may be overstressed 82% by radial strain in the liner, by 100% or more due to notch factor and by 42% with fillet weld connections.

A further object of this invention is, therefore, to provide a connection member between certain predetermined circumferential liner bands which is adapted to connect the liner bands to each other and to the vessel whereby combined bending and axial stresses at the lines of attachment between the liner and the vessel may be kept to conservative limits to attain freedom from static or fatigue failures.

The above and other objects and features characteristic of this invention will be understood more readily from the following detailed description taken in connection with the accompanying drawings, in which:

FIG. 1 is a diagrammatic view in elevation of a liner embodying this invention as it would appear if the shell of a vessel normally surrounding the liner were removed.

FIG. 2 is a sectional view showing a conventional manner of attaching liner plates to each other and to the shell of a vessel.

FIG. 3 is a sectional view showing another conventional manner of attaching liner plates to each other and to the shell of a vessel.

FIG. 4 is a sectional view showing one method of attaching liner plates along their circumferentially extending margins to each other and to the vessel according to one embodiment of this invention.

FIG. 5 is a sectional view showing a modification of the embodiment of FIG. 4.

FIG. 6 is a sectional view illustrating a type of vertical joint between liner plates according to a preferred embodiment of this invention.

FIG. 7 is a sectional view illustrating an alternative circumferential joint between liner plates where it is not necessary to also secure the liner to the shell according to the embodiments of FIGS. 4 or 5.

FIG. 8 is a sectional view illustrating a preferred arrangement of securing certain plate strips to each other and to the shell according to another embodiment of this invention.

FIG. 9 is a sectional view showing one arrangement for attaching vessel nozzle or conduit liners to the vessel liner and the shell according to an embodiment of this invention.

FIG. 10 is a sectional view showing a modification of the arrangement shown in FIG. 9.

FIG. 11 is a sectional view showing a further modified arrangement for securing a nozzle liner to the vessel liner.

FIG. 12 is a sectional view showing still another modified arrangement for securing a nozzle liner to the vessel liner.

Referring more particularly to the drawings, FIG. 1 is a diagrammatic view in elevation of a liner 5 embodying this invention as it would appear if the shell of a vessel normally surrounding the liner were to be removed. The liner 5 is shown to be a composite of large plates and small plates or strips for the purpose of illustrating various types of jointings for the plates and strips.

In order that the present invention may be appreciated more fully, conventional methods of attachment of a lining in a vessel are illustrated in FIGS. 2 and 3. As will be seen in FIG. 2, the plates 6 forming the liner are welded along adjacent vertical and horizontal edges, respectively to each other and to the shell 7 in a manner indicated at 8. Alternatively, the edges of the liner plates 6 have been disposed over a backing strip or plate 10 which is welded to the shell 7, as indicated at 11. The adjacent margins of the liner plates 6 are then bent over the backing plate 10 and their edges are welded to each other and to intermediate portions of the backing plate 10, as indicated at 13. Either of these methods of attachment may afford a limited degree of effectiveness in the attachment of small plates or liner strips such as those indicated at 14 adjacent the top and bottom of the liner. However, to provide a liner of considerable dimensions which is composed entirely of small plates or strips renders the cost of welding excessive. Then, too, this type of welding the joints as shown in FIG. 2 is unsatisfactory from the standpoint of corrosion due to the difficulty of obtaining identical chemistry in the weld metal and the lining plate metal. The joint illustrated in FIG. 3 is also extremely expensive with small plates or strips both from the standpoint of the number of backing plates required for the joints and of the triple lines of welding required for securing the backing plates and the liner plates.

As previously indicated when the sizes of the plates are substantially increased so that the distance between circumferential welds in particular is larger than about 12 inches or more, portions of the liner will be capable of radial inward or outward movement as a result of temperature or pressure conditions or both within the vessel. These movements set up radial and bending stresses as described above which take place adjacent to the weld in the type of attachment shown in FIG. 2 and adjacent to the weld joining the liner plates to the backing plates of FIG. 3, resulting in fatigue of the liner plates at these points. Then, too, axial stresses must also be absorbed at these points which all combine to shorten the life of the liner.

Dealing more specifically with the invention, FIG. 4 illustrates one embodiment of a circumferential joint between adjacent plates 6. This type of joint is preferably provided at points indicated A, B, C, D, E and F but may also be employed at alternate or intermediate points G, H, J, K and L if desired. The joint illustrated in FIG. 4 shows a pair of connecting members 20 connected at their outer ends, as indicated at 21, to adjacent edges of upper and lower plates 6 by welding or other suitable means. The inner abutting ends of members 20 are secured to each other and to the vessel shell 7 as indicated at 26 by welding or other suitable means. The purpose of the members 20 may be illustrated by considering the joint for each plate as being divided into three zones. Zone 1 indicates the liner plate 6 up to its line of connection 21 to the outer end of the member 20 and which may be stressed axially or by hoop stresses from pressure or temperature conditions as described. Zone 2 indicates an elongated tapering portion 23 of the member 20 increasing from the lining thickness at the line of connection 21 to a thickness appreciably greater in amount to an inner portion 24 at the opposite end of the zone. This increase in thickness is designed to reduce bending stresses so that the bending stresses plus axial stresses are within safe limits. The tapering of the portion 23 of member 20 in the zone 2 may be uniform, as shown, or may be stepped in one or more steps or tapered non-uniformly if the conditions of stress do not cause overstressing at any portion of its length. Zone 3 represents said inner portion 24 of a still greater thickness and which is desirable because of the increased stress existing at a notch 25 formed by welding the inner margins of portions 24 of members 20 at 26 to each other and to the shell 7 of the vessel. As will be seen, the thickened zone 3 is produced by providing a shoulder 27 projecting from the face of the portion 24 of member 20 opposing the shell 7 so that the tapered portion 23 at zone 2 is held in spaced relation to the shell 7. This provides accommodation for a backing plate 28 at the vertical or axial joints 29 of the plates 6 which are illustrated in detail in FIG. 6.

The zone 3 is designed to resist a combination of bending stress, notch factor and axial stress. Another important feature of zone 3 resides in the construction of the weld 26. This weld is composed of a plurality of layers of weld metal to reduce corrosion. This weld should preferably consist of at least three layers of weld metal to decrease dilution of the base metal fused in the first layer from materially contaminating the last or outer layer which would otherwise increase the corrosion rate. With the type of liner shown in FIG. 2 fewer layers in the weld 8 are obtainable so that the rate of corrosion results in a reduction of the life of the liner at this area. Thus, failure of the liner frequently is caused by corrosion at this section even before failure as a result of the aforementioned bending and axial stresses prevalent in the type of liner illustrated in FIG. 2.

A modified form of circumferentially extending joint is illustrated in FIG. 5. The connection members 30 may have their outer ends connected at 31 as shown particularly with respect to the upper of the members to the adjacent edge of the liner plate 6 in edge-to-edge relation so that both the liner 6 and member 30 are flush with the inner surface of shell 7. Alternatively, as shown with respect to the lower of the members, the outer end is connected at 31a to the adjacent edge of liner 6 in offset or staggered relation to permit spacing of the liner from the inner surface of the shell 7. This is particularly desirable where vertical joints 29 are provided with backing plates 28. As will be seen, the tapering portion 33 thickens from the liner plate 6 to an appreciable thickness across the zone 2 and the portion 34 continues to thicken towards the joint or weld 32. This arrangement reduces bending stresses of the member 30 due to outward strain of the liner to safe limits. Since inward strain due to temperature variation may occur, the tapering cross-section of portion 33 of zone 2 is still essential to decrease bending stresses. In addition, the cross-section of the portion 34 will be made such that the thickness of the section at the weld 32 is sufficient to absorb without failure the combination of bending stresses, the localized bending stresses caused by the notch 35, and the axial stresses.

FIG. 6 illustrates the preferred type of joint for adjacent vertically or axially disposed edges of the liner plates 6. This joint consists of welding the said adjacent edges of the liner plates 6 to a backing plate 28 of corrosion resistant material similar to that of the lining, as indicated at 29, to avoid contamination of the weld metal by the metal of the shell. The backing plate 28 is free of attachment to the shell 7 to permit free radial expansion and contraction of the plates between their circumferential connections to the shell 7 illustrated in FIGS. 4 or 5.

Although it had been above indicated that all of the circumferential joints of the main body of the liner may be of the type illustrated in FIGS. 4 or 5, it is not usually desirable nor advisable to use this type of circumferential joint throughout the body of the vessel since it is desirable to permit as much free radial deflection of the liner as possible, employing only a sufficient number of circumferential lines of engagement of the liner to the shell to restrain axial movement of the liner relative to the shell. To this end the joints indicated at G, H, J, K and L, alternating with joints A to F, may be fabricated as shown in FIG. 7. This joint consists of a circumferential weld 37 of the adjacent edges of the liner plates 6 to a backing plate 38 to avoid contamination of the weld metal by the metal of shell 7. The backing plate 38 is free of attachment to the shell to permit radial movement of the liner and the backing plate. In some instances it is desirable to restrain axial movement of the liner in the region of this joint, particularly if there is a nozzle or other inlet or outlet pipe communicating with the liner in this region. When such restraint is desired, restraining members 40 are secured to the shell 7 above and below the backing plate 38 by welding indicated at 41. The restraining members 40 may be in the form of circumferentially spaced lugs or continuous bands arranged along the top and bottom of the backing plate 38. In this manner axial movement is restrained while radial deflection of the liner is unrestrained.

FIG. 8 illustrates the preferred manner of securing the relatively narrow lining strips 14 at the top and bottom which form the necks of the liner. Normally these lining strips 14 are relatively thin and preclude multiple layer circumferential welding in the joints 44. As previously pointed out this disadvantage was outlined with respect to the conventional joint illustrated in FIG. 2. It is, therefore, usually desirable to build up layers of weld as indicated at 45 in a cavity provided in the shell surface. The outer surface of the built up layers of weld 45 is then ground to provide an even surface before locating the edges of the strips 14 and applying the weld 44 to said weld 45. This build up of a combination of the welds 44 and 45 reduces contamination of the weld 44 with the metal of the shell 7.

Where nozzles or other communicating pipes are provided it is essential to connect their liners to the vessel liner in order to achieve tightness and freedom from axial movement of the liner but with freedom for radial movement of the vessel liner. One embodiment of a connection between the nozzle liner and the vessel liner is shown in FIG. 9. As will be seen the nozzle 50 is at right angles to the shell 7. A nozzle liner 52 extends along the inner surface of the nozzle 50 with its inner margin 53 extending through the shell 7. This inner margin 53 of the nozzle liner 52 is welded at 54 to a ring shaped connecting member 55 which is similar in cross-section to a connecting member 20 illustrated in FIG. 4. The tapering flange 56 of the connecting member 55 is welded at its outer margin to the adjacent margin of a liner plate 6 as indicated at 57. The connecting member 55 has the same purpose as member 20, namely to avoid high bending stresses in the liner plates 6 and at the root of the weld 54.

A modification of the nozzle liner joint is shown in FIG. 10 in which there is the addition of a ring 58 between the extension 53 of nozzle liner 52 and the liner thickened edge of the connecting member 55. The member 55 is welded as indicated at 59 to the outer edge of ring 58 and to the shell 7. The extension 53 is welded at 60 to the inner surface of ring 58 as well as to the shell 7. The circular ring 58 adds strength to the connection and, in addition, permits the use of connecting members 55 of uniform size and inside diameters for varying nozzle diameters by substituting rings of varying inside diameters according to the diameter of the nozzle.

FIG. 11 illustrates a further modification of the nozzle connection. As will be seen the connecting ring 55 is welded at 61 along its inner circular edge to the shell 7. The extension 53 of the nozzle 52 freely projects beyond the inner surface of the shell 7 and is welded at 62 along its inner edge to the inside defining edge of a ring 63 which is spaced inwardly from the shell 7. The outer margin of ring 63 is welded at 64 to the surface of connecting ring 55. This arrangement permits radial movement of both the nozzle liner and the vessel liner.

A still further modification of a nozzle connection is illustrated in FIG. 12. This figure shows a marginal portion of plate 6 formed to provide a ring buckle 66 around the nozzle opening. The extension 53 of nozzle liner 52 is welded at 67 to the inner margin of plate 6 beyond the ring buckle 66. This type of connection is serviceable under conditions where the radial movement of the liner is only slight.

The embodiments of the invention in which an exclusive property or privilege is claimed are defined as follows:

1. In combination with a hollow, substantially cylindrical vessel, a liner comprising a plurality of plates arranged to form a plurality of continuous annular bands about the interior of the vessel, adjacent bands being integrally connected along their opposing edges to form a continuous liner, and including annular bands of substantial width substantially throughout the length of the vessel, and circumferentially extending means at axially spaced intervals for securing the liner to the vessel to restrain axial movement of the liner relative to the vessel, certain of said restraining means each comprising a connecting member including an elongated tapered section having its outer margin secured along the adjacent margin of a liner band, said elongated tapered section increasing in thickness from the lining thickness to a substantially thickened end section, the length of said tapered section and its degree of taper being determined to reduce bending stresses in the liner resulting from temperature and pressure conditions within the liner so that the bending stresses plus any axial stresses exerted on the liner are distributed along the depth of the tapered section to avoid fatigue failure along the connecting member, the connecting members along the opposing edges of adjacent bands having the edge portion of their thickened sections disposed in face-to-face relation and means joining the thickened sections of said connecting members along the said edge portions to each other and to adjacent surface portions of the vessel.

2. A liner as set forth in claim 1, in which the dimensions of the said thickened section of the connecting member are predetermined to reduce notch stress at its point of connection to the vessel when said stresses are applied to the tapered section.

3. A liner as set forth in claim 1, in which the means joining the thickened sections of adjacent connecting members comprises a plurality of layers of weld metal extending between said connecting members from the surface of the vessel to the exposed surface of the connecting members, said layers being in sufficient number to minimize contamination between the vessel and the contents therein separated by said liner.

4. A liner as set forth in claim 1, in which the thickened section of said connecting member projects beyond the surface of the tapered section opposing the vessel to maintain said tapered section in spaced relation to said vessel.

5. A liner as set forth in claim 1, in which the thickened section and the tapered section are disposed to lie along the inner surface of the vessel.

6. A liner as set forth in claim 1, in which the adjacent margins of said liner bands and said connecting members are welded together in edge-to-edge relation.

7. A liner as set forth in claim 1, in which the adjacent margins of said liner bands and said connecting members are welded together in offset relation.

8. A liner as set forth in claim 1, in which each of said bands of substantial width comprises a plurality of liner plates arranged in end-to-end relation, a backing plate interposed between the vessel and the adjacent ends of said liner plates, and means securing the ends of the liner plates to said backing plate.

9. A liner as set forth in claim 8 in which said backing plate is free of attachment to said vessel.

10. A liner as set forth in claim 1, in which certain of said bands of substantial width have their adjacent margins disposed along one surface of a circumferentially extending backing plate, said backing plate being disposed between said margins of adjacent bands and said vessel and free of attachment to said vessel, and means securing said margins of said bands to the surface of the backing plate remote from the vessel.

11. A liner as set forth in claim 10, including restraining members arranged along opposite sides of said circumferentially extending backing plate to prevent movement of said backing plate in the axial direction of the vessel.

12. A liner as set forth in claim 11, in which said restraining members are secured to said vessel and in which said backing plate is freely disposed therebetween to permit radial movement of the backing plate relative to said vessel.

13. A liner as set forth in claim 1, including at least one nozzle or similar conduit extending through the vessel wall, a liner arranged in said conduit and having its inner margin extending into marginal portions of the vessel liner surrounding said conduit liner and means connecting said inner margin of the conduit liner to the surrounding margin of the vessel liner, said last mentioned means permitting radial movement of the vessel liner.

14. A liner as set forth in claim 13, in which said means connecting said margin of the conduit liner to the surrounding margin of the vessel liner comprises a ring surrounding said conduit liner extension, said ring including a substantially thickened inner section defining an inner annular wall, means welding the conduit liner extension and the said annular wall to each other and to adjacent surface portions of the vessel and a flange section extending circumferentially from said thickened section of the ring, said flange tapering towards its periphery to a thickness substantially equal to the vessel liner, and further means securing the peripheral edge of said tapering flange to an adjacent margin of said vessel liner.

15. A liner as set forth in claim 13, in which said means connecting said margin of the conduit liner includes a ring surrounding said conduit liner extension in spaced relation thereto, said ring including a substantially thickened inner section and provided with a flange section extending circumferentially from said thickened section, said flange being tapered towards its periphery to a thickness substantially equal to the vessel liner and being secured about its peripheral edge to an adjacent margin of the vessel liner, and a second ring arranged concentrically within the first ring, said second ring being variable as to diameter to close the gap between said first ring and the conduit liner extension, said first and second rings being welded to each other and to said vessel, and said second ring and conduit liner extension being likewise welded to each other and to the vessel.

16. A liner as set forth in claim 13, in which said means connecting said margin of the conduit liner to the surrounding margin of the vessel liner includes a ring surrounding said conduit liner extension in spaced relation thereto, said ring including a substantially thickened inner section engaging portions of the vessel surrounding the conduit liner extension, means securing the thickened inner section of said ring to said vessel, a flange section formed integral with said thickened ring section and extending circumferentially therefrom, said flange tapering towards its periphery to a thickness substantially equal to the vessel liner and being welded along its peripheral edge to an adjacent margin of said vessel liner, and a relatively thin annular member arranged across the gap between the inner defining wall of the ring and the conduit liner extension said disk being secured to said conduit liner extension and to said ring to permit movement of said conduit liner relative to the vessel and in the radial direction of said vessel.

17. In combination with a hollow, substantially cylindrical vessel and a liner comprising a plurality of plates arranged to form a plurality of continuous annular integrally connected bands about the interior of the vessel, circumferentially extending means at axially spaced intervals for securing the liner to the vessel to the restrain axial movement of the liner relative to the vessel, certain of said restraining means each comprising a connecting member including an elongated tapered section having its outer margin secured along the adjacent margin of a liner band, said elongated tapered section increasing in thickness from the lining thickness to a substantially thickened end section, the length of said tapered section and its degree of taper being determined to reduce bending stresses in the liner resulting from temperature and pressure conditions within the liner so that the bending stresses plus any axial stresses exerted on the liner are distributed along the depth of the tapered section to avoid fatigue failure along the connecting member, the connecting members along the opposing edges of adjacent bands having the edge portion of their thickened sections disposed in face-to-face relation and means joining the thickened sections of said connecting members along the said edge portions to each other end to adjacent surface portions of the vessel.

18. In combination with a hollow, substantially cylindrical vessel having a liner composed of a plurality of plates arranged to form a plurality of continuous, integrally connected annular bands connected to each other throughout the interior of the vessel, flexible tapering members in the form of circumferential rings tapering from a central section of substantial thickness towards their outer margins to a thickness substantially equal to the thickness of the liner, said tapering members being at axially spaced intervals and securing the liner to the vessel to restrain axial movement of the liner while permitting radial straining of the liner relative to the vessel by means of attachment of adjacent liner bands along the outer tapered margins of the tapering members, said tapering members increasing in thickness from their outer margins in proportion to bending stresses to be carried to the central section, said central section being secured to the vessel to restrain said axial movement of the liner.

References Cited in the file of this patent

UNITED STATES PATENTS

| | | |
|---|---|---|
| 1,992,470 | Carlstrom | Feb. 26, 1935 |
| 2,158,799 | Larson | May 16, 1939 |
| 2,198,331 | Chyle | Apr. 23, 1940 |
| 2,223,318 | Gibb | Nov. 26, 1940 |
| 2,772,860 | Nelson | Dec. 4, 1956 |
| 2,916,182 | Rollins et al. | Dec. 8, 1959 |